United States Patent
Dix et al.

(10) Patent No.: US 12,235,628 B2
(45) Date of Patent: Feb. 25, 2025

(54) RESOURCE MANAGEMENT FOR MODULAR PLANTS

(71) Applicant: ABB Schweiz AG, Baden (CH)

(72) Inventors: Marcel Dix, Mannheim (DE); Katharina Stark, Weinheim (DE); Roland Braun, Niederkassel Luelsdorf (DE); Michael Vach, Wilhelmsfeld (DE); Sten Gruener, Laudenbach (DE); Mario Hoernicke, Landau (DE); Nicolai Schoch, Heidelberg (DE)

(73) Assignee: ABB Schweiz AG, Baden (CH)

( * ) Notice: Subject to any disclaimer, the term of this patent is extended or adjusted under 35 U.S.C. 154(b) by 297 days.

(21) Appl. No.: 17/535,724

(22) Filed: Nov. 26, 2021

(65) Prior Publication Data

US 2022/0163949 A1   May 26, 2022

(30) Foreign Application Priority Data

Nov. 26, 2020  (EP) .................................... 20210060

(51) Int. Cl.
  *G05B 19/418*  (2006.01)
(52) U.S. Cl.
  CPC ... *G05B 19/41845* (2013.01); *G05B 19/4183* (2013.01); *G05B 19/41885* (2013.01)
(58) Field of Classification Search
  CPC .......... G05B 19/41845; G05B 19/4183; G05B 19/41885; Y02P 90/30; G06Q 50/04; G06Q 10/04; G06F 30/27
  See application file for complete search history.

(56) References Cited

U.S. PATENT DOCUMENTS

| | | | |
|---|---|---|---|
| 5,666,297 A | * | 9/1997 | Britt ........................ G06F 17/12 706/920 |
| 6,349,237 B1 | * | 2/2002 | Koren .................... B23Q 39/02 700/94 |
| 11,256,241 B1 | * | 2/2022 | Sobalvarro ...... G05B 19/41885 |

(Continued)

FOREIGN PATENT DOCUMENTS

| | | |
|---|---|---|
| CN | 102567503 A | 7/2012 |
| CN | 107273400 A | 10/2017 |
| EP | 1615150 A | 1/2006 |

OTHER PUBLICATIONS

Michael Weyrich, Philipp Klein, Frank Steden, Reuse of modules for mechatronic modeling and evaluation of manufacturing systems in the conceptual design and basic engineering phase, IFAC Proceedings Volumes, vol. 47, Issue 3, 2014, pp. 3450-3455 (Year: 2014).*

(Continued)

*Primary Examiner* — Christopher E. Everett
(74) *Attorney, Agent, or Firm* — Leydig, Voit & Mayer, Ltd.

(57) ABSTRACT

A computer-implemented resource management method for modular plants may include: receiving data identifying a required module type to be assembled into the modular plant as part of a module pipeline including one or more modules; and executing an optimization algorithm to select, from a plurality of modules having the required module type, a module for inclusion in the module pipeline on the basis of one or more predetermined optimization criteria.

14 Claims, 4 Drawing Sheets

(56) References Cited

U.S. PATENT DOCUMENTS

| | | | |
|---|---|---|---|
| 2003/0046130 A1* | 3/2003 | Golightly | G06Q 30/0206 |
| | | | 705/7.29 |
| 2019/0370083 A1 | 12/2019 | Demeilliez et al. | |
| 2020/0209817 A1* | 7/2020 | Lee | H04L 67/12 |

OTHER PUBLICATIONS

Atharv Bhosekar, Marianthi Ierapetritou, Modular Design Optimization using Machine Learning-based Flexibility Analysis, Journal of Process Control, vol. 90, 2020, pp. 18-34 (Year: 2020).*

An integrated modular design methodology based on maintenance performance consideration, Hao Zheng, Yixiong Feng, Jianrong Tan, and Zixian Zhang, Proceedings of the Institution of Mechanical Engineers, Part B: Journal of Engineering Manufacture 2017 231:2, 313-328 (Year: 2017).*

Dix et al., "Simulation and Re-engineering of Industrial Services: A Case Study from an Industrial Equipment Manufacturer," *2015 10th International Conference on P2P, Parallel, Grid, Cloud and Internet Computing (3PGCIC)*, 484-489 (Nov. 4, 2015).

Verein Deutscher Ingenieure E.V., "Automation engineering of modular systems in the process industry—General concept and interfaces," VDI/VDE/NAMUR 2658 Blatt 1, 177 pp., (Oct. 2019).

European Patent Office, Extended European Search Report in European Application No. 20210060.8, 9 pp. (Mar. 30, 2021).

Michael Weyrich et al., "Assisted engineering for mechatronic manufacturing systems based on a modularization concept," Proceedings of 2012 IEEE 17th International Conference on Emerging Technologies & Factory Automation, ETFA 2012, Sep. 2012, pp. 1-8, IEEE, Krakow, Poland.

Ting Yang et al., "Research on Plant Layout and Production Line Running Simulation in Digital Factory Environment," Computational Intelligence and Industrial Application, 2008, Dec. 2008, pp. 588-593 IEEE, Piscataway, NJ, USA.

Minh Dang Nguyen et al., "Emergence of simulations for manufacturing line designs in Japanese automobile manufacturing plants," 2008 Winter Simulation Conference, Dec. 2008, pp. 1847-1855, IEEE, Miami, FL, USA.

The Patent Office of the People's Republic of China, Office Action in Chinese Patent Application No. 202111412803.4, 16 pp. (Nov. 25, 2024).

* cited by examiner

RESOURCE MANAGEMENT FOR MODULAR PLANTS

CROSS-REFERENCE TO PRIOR APPLICATION

Priority is claimed to European Patent Application No. EP 20210060.8, filed on Nov. 26, 2020, the entire disclosure of which is hereby incorporated by reference herein.

FIELD

One or more embodiments of the present invention may relate to resource management system for modular plants.

BACKGROUND

The Modular Type Package (MTP) standard in the field of modular automation systems creates a framework for interoperability between modules and the orchestration system, allowing industrial process plants to be built up and engineered in a more modular way, with the goal of simplifying process plant engineering and life cycle management. These advantages are realized by prefabricated and well-tested modules, called PEAs (Process Equipment Assembly), that can easily be put together in different combinations so that different recipes can be realized.

In today's modular plants, modules are mostly defined and created individually and then integrated manually into the overall plant by the plant engineer. The integration of modules into the plant is a major engineering effort which involves ensuring input and output flow compatibility, the correct calibration of process parameters, and the proper management of alarms. Plant operators often invest significant time and resources in the integration of modules into the plant.

SUMMARY

One or more embodiments of the present invention may provide a computer-implemented resource management method for modular plants. The method may include: receiving data identifying a required module type to be assembled into the modular plant as part of a module pipeline comprising one or more modules; and executing an optimization algorithm to select, from a plurality of modules having the required module type, a module for inclusion in the module pipeline on a basis of one or more predetermined optimization criteria.

There may be therefore a need for more effective resource planning and management for modular plants. This need may be met by the subject-matter of the independent claims. Optional features are set forth by the dependent claims.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

According to a first aspect, there is provided a computer-implemented resource management method for modular plants. The method comprises: receiving data identifying a required module type to be assembled into the modular plant as part of a module pipeline comprising one or more modules; and executing an optimization algorithm to select, from a plurality of modules having the required module type, a module for inclusion in the module pipeline on the basis of one or more predetermined optimization criteria. The data identifying the required module type may comprise data identifying a module of that type.

The optimization algorithm may simulate operation of one or more candidate pipelines each comprising at least one of the plurality of modules having the required module type. In particular, where the optimization criteria comprise one or more of capacity, energy consumption, and time-to-service, the optimization algorithm may identify one or more bottlenecks or inefficiencies in the simulated operation of a said candidate pipeline.

The method may comprise presenting results of the simulation to the user and receiving user selection of a said candidate pipeline.

The optimization algorithm may utilize a machine learning model trained to select modules for inclusion in module pipelines based on one or more of module attributes and collected usage data relating to modules.

The optimization algorithm may perform a local optimization for optimizing only the said module pipeline, or a global optimization to select a plurality of modules of the required type to be assembled into respective module pipelines in the modular plant.

The optimization algorithm may utilize one or more of (i) module attributes of the plurality of modules, and (ii) collected usage data relating to prior use of the plurality of modules in a modular plant (the collected usage data relating for example to one or more of: mean time between failure; module uptime; utilization rates of services and equipment; prior calibration parameters; frequent plant contexts; maintenance performed; materials/medium processed; application purpose and restrictions for chemical reactions; module availability schedule; maintenance cycles/intervals). Additionally or alternatively, the optimization algorithm may utilize data indicating performance of prior module combinations in selecting the module for inclusion in the module pipeline.

The optimization algorithm may select, from the plurality of modules having the required module type, a plurality of candidate modules for inclusion in the module pipeline and rank the candidate modules according to the one or more predetermined optimization criteria.

Any feature or sub-aspect of any of the second-fourth aspects (in particular those described with reference to the optimization component) may apply, mutatis mutandis, also to the first aspect, and vice versa.

According to a second aspect, there is provided a resource management system for modular plants. The system comprises a database providing a module library or repository of semantic modules (module representations) representing respective modules in a module pool, at least one said semantic module comprising a semantic description of the respective module, wherein the semantic description comprises abstract data according to a semantic data model, and wherein the abstract data describes attributes of the respective module not found in a standard description file for the module. Thus, the semantic description extends the standard description file for the respective module for example by using a wrapper containing the semantic description. The module attributes may comprise any suitable data or parameters defining the module. For example, the module attributes may comprise one or more of: input/output attributes; module functionality; module parameters; process parameters; calibration parameters.

The resource management system thus provides for a smart, information enhanced unit pool for plant operators. The resource management system provides for improved usability and higher comfort in the use of software tools by plant operators, less error-prone unit-in-plant setups and more optimized plant performance.

The semantic description may further comprise collected usage data relating to prior use of the respective module in a modular plant. The collected usage data may comprise any suitable data characterizing prior module performance, usage or configuration, and may relate to previously measured key performance indicators including one or more of: mean time between failure; module uptime; utilization rates of services and equipment; prior calibration parameters; frequent plant contexts; maintenance performed; materials/medium processed; application purpose and restrictions for chemical reactions; module availability schedule; maintenance cycles/intervals.

In this way, the resource management system assists the plant operator in administrating/managing their stock of existing modules (e.g. 12 dosing and 10 reaction units, and so on). Some modules might currently be used in the plant while others are not. For those being used, data may be collected relating to their usage (e.g. what materials are processed), or their components' performance (e.g. uptimes, attrition of valve materials), their maintenance key performance indicators (KPIs, e.g. module life cycle), and so on, and continually added to the database. When a new plant is to be built, or when the existing plant is to be reconfigured, the plant operator may view the pool of modules via the module library or repository and select the optimal module for a given functionality, with reference to the semantic description and collected usage data. For example, the plant operator may simply select the one available module that processed the same material that the sought module is expected to process and that has the longest time until the next scheduled maintenance.

The semantic description may further comprise prior configuration data relating to a configuration of the respective module in at least one prior modular plant, the prior configuration data being usable for configuring the module for use in a further modular plant. The prior configuration data may relate to prior engineering data expediting reuse of the module.

Thus, with this technical platform, plant operators are able to select and re-use preconfigured modules. In this way, re-use is facilitated not only of individual modules but also of larger functional blocks, simplifying the tasks of the engineering of modules and of the assembly of modular plants.

Moreover, via the semantic description and collected usage data, a mechanism is provided for automatically finding and recommending optimal module and process pipeline compositions for the modular plant. In one example, the resource management system may further comprise a module pipeline generation engine configured to receive input data indicating at least one precondition and at least one postcondition of a required pipeline for the modular plant, and to generate a suggested semantic module pipeline representing one or more modules capable of transforming the at least one precondition into the at least one postcondition. The module pipeline generation engine may be configured to select from the module library one or more semantic modules for inclusion in the semantic module pipeline on the basis of the module attributes contained in the semantic description of the selected semantic modules. The present disclosure envisages various kinds of module attribute which may be used for selecting modules.

In particular, the module pipeline generation engine may be configured to determine, on the basis of input/output attributes of the semantic modules in the module library, a sequence of one or more semantic modules to form the semantic module pipeline in which the input attributes of the first semantic module in the sequence match the at least one precondition and in which the output attributes of the last semantic module in the sequence match the at least one postcondition. The module pipeline generation engine may be configured to generate the semantic module pipeline using a plurality of modules selected from the module library to provide intermodular compatibility of the selected modules. The module pipeline generation engine may be configured to determine intermodular compatibility on the basis of the respective module attributes. The module attributes indicating intermodular compatibility may comprise the input-output attributes of the selected modules. The module pipeline generation engine may thus be configured to select modules for inclusion in the suggested pipeline on the basis of input-output compatibility of the selected modules. In the sequence of modules so determined, the modules are thus selected so that the output attributes of a module match the input attributes of any subsequent module and so that the input attributes of a module match the output attributes of any preceding module. Input and output attributes may be compared and matched in this way using semantic data describing those attributes which accords to (i.e. uses the language and vocabulary of) the semantic data model.

Additionally or alternatively, the module pipeline generation engine may be configured to determine, on the basis of functionality attributes of the semantic modules in the module library, a sequence of one or more modules to form the module pipeline whose functionalities combine to transform the at least one precondition into the at least one postcondition. In this case, attributes indicating intermodular compatibility may comprise attributes defining functionality of the modules, and wherein the module pipeline generation engine is configured to generate the suggested pipeline on the basis of functional compatibility between the selected modules. For example, where one module requires a minimum temperature at the input, the pipeline generation engine may select a heater module as the preceding module in the suggested pipeline. Again, attributes defining functionality of the modules may be compared and matched using semantic data describing those attributes which accords to the semantic data model.

The pipeline generation may thus take the form of a rule-based, data-driven execution engine (or composition engine), with exemplary rules including input-output compatibility and functional compatibility, among others. The rules themselves may be defined by or may use semantic data according to the semantic data model.

In any of these ways, the system provides for automatic generation of suitable/feasible pipeline suggestions for the plant operator concerning how to compose a new pipeline for a given purpose.

The resource management system may comprise an optimization component configured to: receive data identifying a required module type to be assembled into the modular plant as part of a module pipeline comprising one or more modules; and execute an optimization algorithm to select, from a plurality of modules in the module library having the required module type, a semantic module representing a module for inclusion in the module pipeline on the basis of one or more predetermined optimization criteria. The module pipeline generation engine may be configured to generate a plurality of suggested pipelines for comparison according to one or more predetermined criteria. The optimization algorithm may be configured to perform a local optimization for optimizing only the said module pipeline, or a global optimization to select a plurality of modules of the required type to be assembled into respective module pipelines in the modular plant. The predetermined optimization criteria may comprise one or more of product quality; throughput; capacity; resource/material efficiency; energy efficiency; energy consumption; time-to-service; uptime; equipment availability; mean time between failure; utilization rates of services and equipment; minimization of module usage. In particular, where the collected usage data comprises previously measured key performance indicators, these may be used to determine an optimum or preferred selection and sequence of modules for transforming the precondition(s) into the postcondition(s) while satisfying the predetermined criteria. Where the optimization component selects, from the plurality of modules having the required module type, a plurality of candidate modules for inclusion in the module pipeline, the optimization component may rank (using e.g. the ranking component described herein) the candidate modules according to the one or more predetermined optimization criteria, and output the ranked candidate modules for user selection.

To assist the plant operator in locating appropriate modules, the database may be configured to provide search functionality to allow searching of the module library.

To assist the plant operator in validating the selection of modules/pipelines, the resource management system may comprise a simulation component configured to provide simulation functionality to allow simulation of the operation of a module pipeline comprising one or more modules in a modular plant. Additionally or alternatively, the resource management system may comprise a ranking component configured to facilitate the plant operator in selecting the best module with respect to given optimization criteria from a set of possible pipeline options.

According to a third aspect, there is provided a computer-implemented resource management method for modular plants. The method comprises: providing via a database a module library storing semantic modules representing respective modules in a module pool, at least one said semantic module comprising a semantic description of the respective module, wherein the semantic description comprises abstract data according to a semantic data model, and wherein the abstract data describes attributes of the respective module not found in a standard description file for the module. Any feature or sub-aspect of the second aspect may apply, mutatis mutandis, also to the third aspect.

According to a fourth aspect, there is provided a computer-implemented resource management method for modular plants. The method comprises (using for the example the module pipeline generation described herein): receiving input data indicating at least one precondition and at least one postcondition of a required pipeline for the modular plant; and determining a suggested module pipeline comprising one or more modules capable of transforming the at least one precondition into the at least one postcondition. Any feature or sub-aspect of the first-third aspects (in particular those described with reference to the module pipeline generation engine) may apply, mutatis mutandis, also to the fourth aspect.

According to a fifth aspect, there is provided a method of managing resources for a modular plant. The method comprises: using a resource management system or method as described herein to perform one or more of the following actions: (i) accessing the repository to select one or more modules from the module pool for inclusion in a module pipeline comprising one or more modules; (ii) performing automatic pipeline generation to generate a suggested module pipeline comprising one or more modules; (iii) optimizing a module pipeline comprising one or more modules; (iv) ranking module pipelines according to miscellaneous optimization criteria; (v) simulating the operation of a module pipeline comprising one or more modules. The method may further comprise assembling the module pipeline into the modular plant.

According to a sixth aspect, there is provided a method of creating and/or maintaining the resource management system of the second aspect. The method comprises: collecting usage data relating to use of a module in a modular plant; and uploading the collected usage data to the database to be included in a wrapper for the module.

According to a seventh aspect, there is provided a computing device comprising a processor configured to perform computer-implemented methods as described herein.

According to a eighth aspect, there is provided a computer program product comprising instructions which, when executed by a computing device, enable/cause the computing device to perform computer-implemented methods as described herein.

According to a ninth aspect, there is provided a computer-readable medium comprising instructions which, when executed by a computing device, enable/cause the computing device to perform computer-implemented methods as described herein.

According to a tenth aspect, there is provided a modular plant assembled at least partially using the method of the fifth aspect.

One or more embodiments of the invention may include one or more aspects, examples or features in isolation or combination whether or not specifically disclosed in that combination or in isolation.

These and other aspects of one or more embodiments of the invention will be apparent from and elucidated with reference to the embodiments described hereinafter.

Described herein is resource management system for modular plants. The resource management system comprises one or more of the following components: (i) a module library comprising semantically annotated modules; (ii) a pipeline generation engine; (iii) an optimization component; (iv) a simulation component. The resource management system may also be referred to as a resource planning system. The resource management system may be implemented in software, firmware, hardware, or any combination thereof, for example using the computing device described herein The resource management system may form part of, or comprise, an engineering tool or dashboard for planning, configuring, and/or administering modular plants. As described further below, the resource management system implements a semantic data model to provide for abstract representations of modules, module pipelines, or modular plants.

The module library contains one or more semantic modules stored in a repository such as a database. A semantic module comprises instance data representing, describing, or defining a module for a modular plant using the semantic data model. The semantic module may also be described as a module representation, module description, or module definition. In the context of the present disclosure, the terms "module" and "unit" may be used interchangeably. The module library may store further heterogeneous data items (such as specifiers, annotations, values, history records) relating to the semantic modules. The module library thus serves as a place (or knowledge representation system) for gathering global and local domain knowledge regarding modules. The module library may be implemented using a database involving any centralised or distributed data storage. For example, one or more data storage units provided by the resource management system, by the modules themselves, or by other elements of the modular plant, may be used to implement the database. In particular, the data storage 808 described below may be used to implement the database. The semantic modules stored in the module library may represent modules which are real or virtual, owned (in the possession of the plant operator) or not yet owned (e.g. available for purchase), available (currently being used in a plant) or potentially available. Thus provided is a pool or repository of modules which may be described as a smart unit pool By creating the semantic modules and storing and registering them in the module library, it is possible to search for and discover the semantic modules later and to select modules to be composed into process pipelines. In particular, to assist the plant operator in locating appropriate modules, the module library may provide search functionality.

The term "virtual module" as used herein refers to a type or class of modules, whereas the term "real module" refers to an instance of a module of a particular type. A real module may be implemented in software, firmware, hardware, or any combination thereof. A software module providing a control configuration for a hardware module may be referred to as a "function module". For a virtual module, the semantic module may be implemented as a template for a module of a particular type, such as a heating module, dosing module, mixing module, and so on. The template may comprise fields holding fixed values which are valid for all modules of the particular type. The template may further comprise one or more placeholders for values that may be set for real modules, and/or one or more pre-set values which may later be altered. For a real module, the semantic module may comprise the template for the relevant module type but supplemented with one or more values representing the real module. In this way, the template accommodates process knowledge or engineering knowledge via the fields in the template.

Thus, modules are described using a semantic description which accords to the semantic data model. The semantic description may specify any one or more module attributes of the module. The module attributes (which may also be referred to as annotations, properties, characteristics, specifiers, or features) may comprise any suitable data describing the module. For example, the semantic description may describe the module in terms of module attributes comprising one or more of: input/output attributes, module functionality; module components; module parameters; module usage; process parameters; calibration parameters; data input to, processed by, and output from the module. The semantic description provides a common interface that holds to the Semantic Web Stack (i.e. RESTful APIs, accessible via HTTP, etc.). Via matching of semantic descriptions between modules, process pipelines may be manually or automatically generated, as described in more detail below.

The semantic description may specify relationships between inputs and outputs of the module. In particular, the semantic description may specify one or more preconditions and one or more postconditions of the module. Preconditions and postconditions specify conditions which can, should, or must exist at the inputs to and outputs from the module. A precondition may be described in terms of an input attribute or characteristic while a postcondition may be described in terms of an output attribute or characteristic. Preconditions and postconditions may for example specify attributes such as material identities or material states which are input to and output from a module, respectively. The module may thus transform at least one precondition into at least one postcondition. In material processing, for example, a precondition may be an educt and a postcondition may be a product. By "educt" is meant any substance, composition or material which is to be reacted with at least one other educt to form a product. The module thus transforms the educts into the product, i.e. the material identity is transformed. The module may transform one material state into another material state for example via heating, stirring, refining, and so on. By "state" is meant herein any property, characteristic, or condition of a single material and not just the state of aggregation. The semantic description may further specify one or more conditions or constraints under which the module transforms the precondition into the postcondition. Additionally or alternatively, preconditions and postconditions may specify one or more of the form, structure, or connection modality of the inputs and outputs of the module.

For a real module, the semantic description may further comprise collected usage data relating to prior use of the real module in a modular plant. The collected usage data may for example comprise any one or more of prior engineering data; prior calibration parameters; frequent plant contexts; maintenance performed; materials/medium processed; application purpose and restrictions for chemical reactions. The collected usage data may be usable for expediting the configuration of the module for use in a further modular plant. For example, one value in the template for the real module may identify the last material processed (e.g. nuts, which may be important for plants that process grocery but that want to also produce grocery for people with nuts allergy). Another value may identify non-functional services of the real module (e.g., for an oven module, a value indicating "Service FanOven broken, but Top&BottomPlateHeat Baking still possible").

The collected usage data may comprise performance data. For example, the collected usage data may comprise one or more previously measured key performance indicators (KPIs). KPIs that may be measured may comprise for example one or more of: mean time between failure; uptime; utilization of services and equipment; availability schedule; maintenance cycles/intervals. Many other examples will be known to the person skilled in the art. Such performance data may be useful for optimizing the selection of modules for pipelines, as described further below.

The semantic data model provides a common or standardised vocabulary or ontology (connecting vocabulary with pre-existing knowledge and rules) for describing modules, module pipelines, and modular plants, as will now be described. The semantic data model may also be described as a conceptual or abstract data model. The semantic data model structures data in a specific logical way using semantic information that adds meaning to the data and the relationships that exist within the data.

"Semantic data" as used herein is abstract data which can represent any attribute of a module, pipeline, plant, or material, in particular, input/output attributes of modules expressed in terms of material identity (e.g. input/output materials) or material state (e.g. material in a raw state or in a refined state, cooled or heated, liquid or solid). The semantic data may represent entities at different levels of abstraction. For example, at the highest data abstraction level, semantic data may represent attributes such as: functionality; material; signal; energy; information; module specification, among others. At a lower level, semantic data may represent attributes such as: power; capacity; temperature e.g. optimal temperature; material identifier; material features; durability; heat transfer; input tube diameter; tank capacity; max reactor pressure; max capacity, among others.

An instance of semantic data may comprise one or more attributes that are encoded by means of an n-dimensional vector or condition vector. In one example, steel in solid state with specific extra-high durability is represented as:
zeroth dimension: type of attribute: "material"=0
first dimension: material: "steel"=76,
second dimension: aggregate-state: "solid"=3,
third dimension: durability: "extra-high"=10,
yielding the vector [0,76,3,10].

A purification process module might require steel as input. Specifically, it might require, as the precondition, liquid steel: [0,76,2,-], where "2" represents aggregate-state: "liquid" and "-" in the third dimension signifies no requirements with respect to the durability attribute. Hence, a determination may readily be made that the given steel [0,76,3,10] does not match the precondition [0,76,2,-] of the module. Thus, the process pipeline would require a preceding melting module that melts the solid material in order to transform the solid steel [0,76,3,10] into liquid steel [0,76,2,10], so as to match the precondition of the purification process module, [0,76, 2,-]. Specifically, the melting module should have the precondition: [0,-,3,-] and the postcondition: [0,-,2,-]. In this example, only four dimensions are specified, but of course it is possible to specify more or fewer attributes as conditions or restrictions, such as input tube diameter, pressure of the liquid that flows in, etc.

In another example comprising a cake bakery plant, white and black dough (educts) can be processed in order to yield marble cake (product). Here, the material white dough in rationed state might be represented by [0,1,1,1], with 0 for material, 1 for dough, 1 for white (dough), 1 for rationed state, and the material black dough in rationed state might be represented by [0,1,2,1], with 0 for material, 1 for dough, 2 for black (dough), 1 for rationed state. Both are processed separately and stirred white dough [0,1,1,2] as well as stirred black dough [0,1,2,2] is obtained (where the last component with value 2 represents "stirred" state of the dough. Next, these two are merged and baked together, which yields a ready-to-eat cake [0,63,-,-,1,10], where 0 stands for material, 63 encodes "cake", two blank dashes say that the state and color is not defined, 1 stands for type of cake: "marble cake", and 10 stands for "extremely hot".

Similarly, chemical or physical processes including reacting ingredients, side conditions like temperature or pressure, etc., can entirely be described by means of abstracted condition vectors.

The semantic data model implemented by the resource management system 100 defines the meaning of individual components in the n-dimensional vector as well as the order in which the components appear, to provide consistency between different instances of semantic data. In one example, the first dimension may describe the overall context, such as: material/function/information flow/energy flow. The second and following dimensions may include further attributes according to their level of abstraction and statistical importance. In one example, attributes may be specified in the order: steel, heating, value propagation, heat transmission.

The semantic data model may extend the n-dimensional condition vector by implementing linked conditions, for example by means of (inner or outer) vector products or cross products. In one example, in which raw hot steel is processed into refined hot steel, not only the material component is important, but also the heat transfer that takes place, since the steel is to remain hot. Here, both material and heat transfer may be represented via the condition vector and, since they impact each other, furthermore via a vector product.

Based on the defined order of components in the condition vectors, the resource management system may prioritize one component over others, for example in the pipeline generation algorithm, as described further below.

Furthermore, the semantic data model may define a semantic plant schema in which at least one attribute represented by a component of the n-dimensional vector defines a restriction or range, e.g., a [min/max] value, or an [operatingPoint+/−epsilon] value. The restriction may be represented by means of a function of further parameters, e.g. min-max-pressure p depending on temperature: p_min/max=f(temp). The restriction can automatically be obtained from plant specification documentation, for example an MTP file, or may be provided by the plant operator or a plant engineer. The schema definition may facilitate high-level schema validation as well as module control.

Furthermore, the semantic data model may provide for semantic description of modules specifying multiple services provided by a module, and/or nesting of modules (a module within a module, for example a stirring module within a heating module).

The resource management system is thus configured to implement a semantic data model providing for one or more of the following: modelling pre- and postconditions with one or more attributes, each with optional further annotations, optionally recursively; matching of pre- and postconditions. optionally with multi-index components and annotations; feeding forward/backward of pre- and postcondition (e.g. if a stirring module requires, as precondition, rationed components at a temperature of 45 degrees, feeding this back to the preceding heating module to be set as the goal temperature).

In this way, a semantic module is able to consume and produce semantic data using the semantic data model, as described above. The semantic data is available in the semantic plant process context and is processed/manipulated but remains available (possibly in a different state (raw of refined oil) or with different annotations (hot or cooled down) within this semantic plant process context.

The semantic description of plant equipment such as a module may build upon information available from documentation pertaining to that plant equipment. For example, for a module, a standard description file such as an MTP defining the associated module may be available. The semantic description for the module may comprise information taken from the documentation and translated so as to accord to the semantic data model. However, it will be understood that the semantic description disclosed herein may be based on standards other than MTP. The MTP can be seen as a type description which specifies the building plan of the module. The MTP specifies, for example, module I/O (information-tech-wise, material-tech-wise; each with name and ID), module topology, HMI, state machine (this may be the same for all MTPs but with services indicating which states are in fact used), services (names only), and recipes. The module provider, however, does not necessarily know anything about the application or plant process in which the module can be used. Hence the MTP does not provide description fields for all attributes that are of interest to the plant operator. Thus, to cover process knowledge, and to provide standardized vocabulary to describe this process knowledge, the module library wraps or extends the MTP with a wrapper comprising an extended semantic description of the module.

Figure 1:
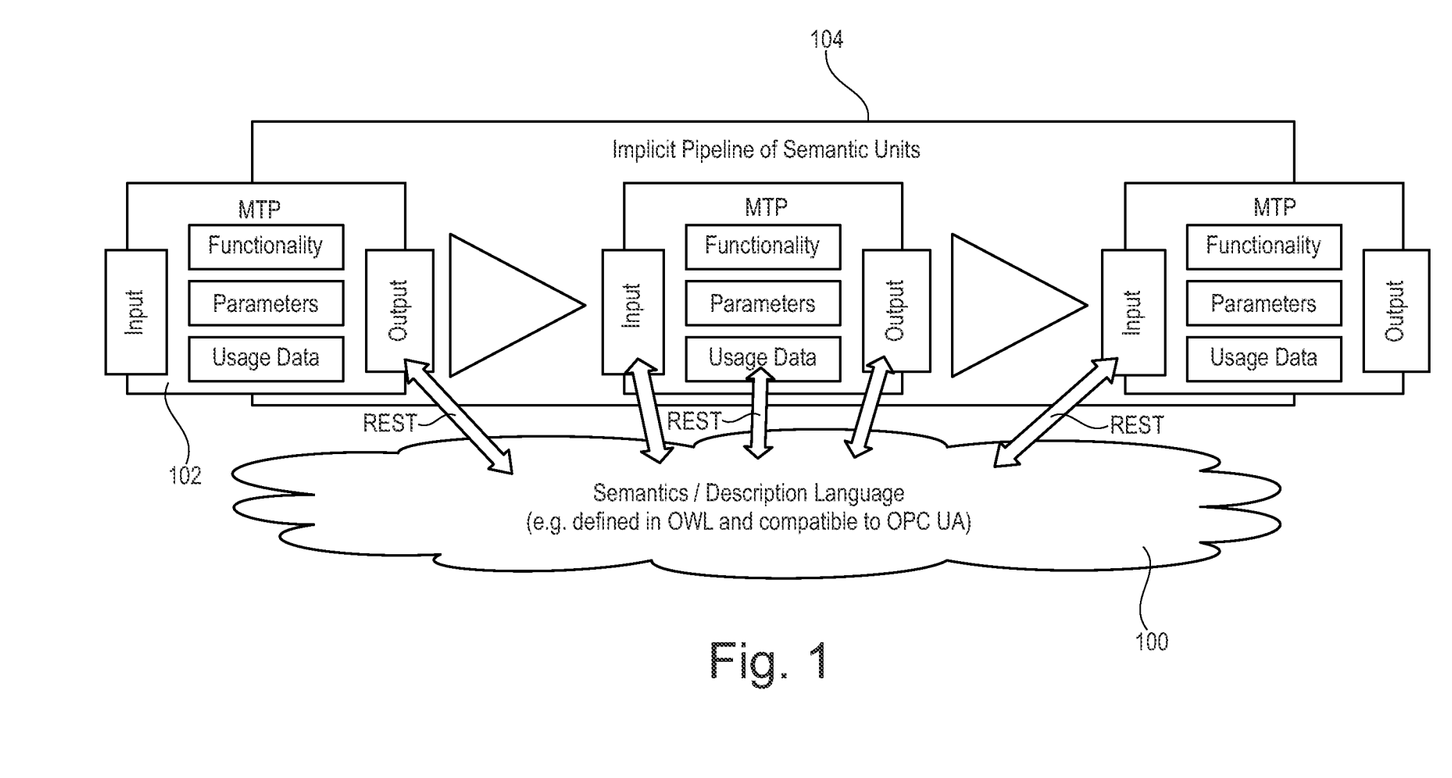
FIG. 1 illustrates a semantic pipeline representing a physical pipeline for an industrial modular plant via a sequence of interconnected semantic modules.

FIG. 1 illustrates a number of semantic modules 102 which have been assembled to form a semantic pipeline 104. Here, a "semantic pipeline" may be understood as instance data describing a pipeline of one or more semantic modules using the semantic data model, and may also be referred to as an "implicit pipeline", "pipeline representation", "pipeline description", or "pipeline definition". As shown, each semantic module 102 is based on a standard description file (here, the MTP) for the module 102. The module library 100 comprises a semantic control layer which extends the MTPs with a wrapper comprising the extended semantic description of the modules according to the semantic data model. The underlying MTP is hidden and not directly accessible. The semantic description is machine-readable and machine-processable. The semantic description as shown in FIG. 1 extends the MTP by including, among others, the following attributes: input/output attributes, functionality, parameters, and collected usage data. It will be however be understood that this arrangement is not intended to be limiting. The semantic description may further extend the MTP by including mappings to, for example, the Asset Administration Shell (AAS) IEC-63278-1 ACD, ISO-15926, IEC-62424, Blanco-XML, PA-DIM. The semantic description may further extend the MTP by including a set of base operations as defined for example in SkaMPi (VDI Richtlinie 2776). SkaMPi comes with 15 base operations (Grundoperationen) that describe Services (e.g. homogenize/"Homogenisieren", heating/"Heizen", dosing/"Dosieren", etc.) along with their typical process-technical attributes (e.g. pressures, volumes, currents, pressure gradients, heating power, precision, concentration, etc.) for comparison and consistency between process requirements and FEA/PEA capabilities. Also, the parameters and set-points for these base operations can be relevant in order to link and check the base operations in one module with respect to those in another module, e.g. parameters, values, min-max-values, etc. These may be used to describe more complex module services/functionalities, e.g., as a chain of subsequent base operations. For instance, a high-temperature-mixing module can be represented as a chain of heating and mixing base operations.

In one exemplary semantic description of a module which comprises a tank, the MTP contains the input/output features of the tank and describes the functionality of the tank in terms of its storage capacity for liquids, while the extended semantic description covers other aspects such as pressure limits, min/max temperatures, other tolerance boundaries, and so on.

In another exemplary semantic description of a module comprising a reactor, the MTP allows inputs and outputs to be defined, while the extended semantic description defines the ratio of e.g. two inputs $H_2$ and $O_2$ (e.g. ⅔ $H_2$ and ⅓ $O_2$) which are to be reacted in the reactor, and optionally also the required/optimal reaction temperature and pressure (along with potentially critical values/thresholds). Moreover, the semantic description may further specify that the tubes that connect this reactor to possible other previous or subsequent units in a pipeline have a diameter of 0.5 meters, such that a translation flange is required in case the connecting unit has input/output tubes with a diameter of only 0.25 meters.

The extended semantic description may differentiate between continuous process and batch process unit: for example, a batch process module might process 100 L of liquid per execution, vs. a continuous process module that processes 100 L of liquid per hour, and hence has to be (continuously) provided with liquid in order avoid downtime.

As will be described in more detail below, the semantic description enables—among other possibilities—semantic module-to-module-matching (pipeline generation), sanity checks useful for pipeline generation, plant process simulation (i.e. providing the initial inputs and obtaining the simulated final outputs to determine whether the plant functions as intended), plant- and module-based optimization, and calibration and automation (for example to find bottlenecks, e.g. what happens if Module 1 connected to Module 2 is set to produce a higher output such that Module 2 reaches or overruns its tolerance boundary and enters a critical state).

The module library assists the plant operator in administrating/managing their stock of existing modules (e.g. 12 dosing and 10 reaction units, and so on). Some modules might currently be used in the plant while others are not. For those being used, data may be collected relating to their usage (e.g. what materials are processed), or their components' performance (e.g. uptimes, attrition of valve materials), their maintenance key performance indicators (KPIs, e.g. module life cycle), and so on, and continually added to the database. When a new plant is to be built, or when the existing plant is to be reconfigured, the plant operator may view the module library and select the optimal module for a given functionality, with reference to the semantic description including collected usage data. For example, the plant operator may simply select the one available module that processed the same material that the sought module is expected to process and that has the longest time until the next scheduled maintenance.

Using the module library, plant operators are able to select and directly re-use pre-defined (preconfigured), existing modules from the pool and thus decrease the required engineering efforts. In this way, re-use is facilitated not only of individual modules but also of larger functional blocks, simplifying the tasks of the engineering of modules and of the assembly of modular plants.

Moreover, where the real version of a module is not yet available in the pool, the system may provide functionality allowing the plant operator to ascertain by means of virtual modules in the pool whether a particular pipeline could be assembled for a given new plant. By providing the semantic description of the modules, a mechanism is provided for manually and/or automatically finding and recommending feasible or optimal modules and pipeline compositions for a newly-to-be-planned modular plant. These recommendations may be based not only on compatibilities of the modules determined via the semantic description but also on specific optimization criteria, as explained further below.

Hence, module-based virtual engineering of plant processes is hereby provided. The module library thus provides for a smart, information enhanced unit pool for plant operators. This provides the foundation for improved usability and higher comfort in the use of software tools by plant operators, less error-prone unit-in-plant setups and more optimized plant performance. All information within the plant environment may be collected/aggregated in the module library, providing one access point and one unified interface to the overall information in the plant context, and thus making the information searchable and revealing optimization potential, while providing the foundation on which further AI-based applications and algorithms e.g. for pipeline generation or optimization may operate.

It will be understood that the examples given herein are for the purposes of illustration only and that numerous forms of semantic description are possible, being dependent on the module being described. In any case, the extended semantic description disclosed herein is provided to cover such engineering knowledge including any or all of the important engineering facts that are useful for the plant operator in order for the unit to be completely semantically describable.

As mentioned above, the resource management system allows the plant operator to select and combine units from the module library to form pipelines. Using the semantic description of the modules provided by the module library, the plant operator is able to determine compatibility of the modules according to various module attributes. As shown in FIG. 1, for example, the plant operator selects semantic modules 102 according to the their I/O compatibility to form the semantic pipeline 104 (i.e. a representation of a physical pipeline).

However, as also mentioned above, via the semantic description and collected usage data, a mechanism is provided for automatically finding and recommending (e.g. consistent and optimal) module and process pipeline compositions for the modular plant. To this end, the resource management system may further comprise a module pipeline generation engine configured to receive input data indicating at least one precondition and at least one postcondition of a required pipeline for the modular plant, and to generate one or more suggested module pipelines comprising one or more modules capable of transforming the at least one precondition into the at least one postcondition. The pipeline engine may also be referred to as a pipeline composition engine. The module pipeline generation engine may be configured to select from the module library one or more semantic modules for inclusion in the module pipeline on the basis of the module attributes contained in the semantic descriptions in the module library. In particular, the pipeline generation engine may be configured to access the module library, in which each semantic module has semantically annotated pre- and postconditions (e.g. educt(s) and product(s)), and determine whether a connection, i.e., a path, can be found/built from the precondition(s) to the postcondition(s) by gradual or incremental processing through a set/chain of modules. For example, each module takes one (or more) input(s) as precondition and transforms it/them into one (or more) output(s) as postcondition, which in turn are then the input(s), i.e. precondition for the next module and which are in turn processed into the next output(s) i.e. postcondition, and so on. The pipeline generation engine ensures module-to-module and thus pipeline compatibility by definition as it only allows modules to be combined in a row that are compatible according to their semantic description. The generated suggested pipelines may comprise sub-pipelines connected in parallel and/or sequentially.

The present disclosure envisages various kinds of module attribute which may be used for selecting modules.

In particular, the module pipeline generation engine may be configured to determine, on the basis of input/output attributes of the semantic modules, a sequence of one or more semantic modules to form the module pipeline in which the input attributes of the first module in the sequence match the at least one precondition and in which the output attributes of the last module in the sequence match the at least one postcondition. The module pipeline generation engine may be configured to generate the module pipeline using a plurality of semantic modules selected from the module library to provide intermodular compatibility of the respective modules. The module pipeline generation engine may be configured to determine intermodular compatibility on the basis of the respective module attributes. The module attributes indicating intermodular compatibility may comprise the input-output attributes of the selected semantic modules. The module pipeline generation engine may thus be configured to select semantic modules for inclusion in the suggested pipeline on the basis of input-output compatibility of the respective modules. In the sequence of modules so determined, the modules are thus selected so that the output attributes of a module match the input attributes of any subsequent module and so that the input attributes of a module match the output attributes of any preceding module. Matching pre- and postconditions and determination of intermodular compatibility is preferably but not essentially performed using the n-dimensional condition vectors, as described above with reference to the semantic data model, optionally using any schema or prioritization implemented by the model.

Additionally or alternatively, the module pipeline generation engine may be configured to determine, on the basis of functionality attributes of the modules in the pool, a sequence of one or more modules to form the module pipeline whose functionalities combine to transform the at least one precondition into the at least one postcondition. In this case, attributes indicating intermodular compatibility may comprise attributes defining functionality of the modules, and wherein the module pipeline generation engine is configured to generate the suggested pipeline on the basis of functional compatibility between the selected modules. For example, where one module requires a minimum temperature at the input, the pipeline generation engine may select a heater module as the preceding module in the suggested pipeline.

Thus, the pipeline generation engine is configured to use the semantic description of modules provided by the module library automatically to generate suggested pipelines to be provided to the plant operator (who would otherwise have to manually choose, combine and compose modules).

The pipeline generation engine may comprise one or more of: (1) a graph generation and path finding algorithm; and (2) a rule-based algorithm.

The graph generation and path finding algorithm (or graph building algorithm) is configured to connect starting nodes (e.g. the educts of a plant process) to be connected to end nodes (e.g. the products of a plant process). The graph and its nodes represent modules that are connected via edges representing the module-to-module-connections. The algorithm may be used alone or in conjunction with other algorithms in order to accelerate the pre-/postcondition matching by means of restricting the set of modules to be matched. Generally, the algorithm may be configured to perform forward-propagation and/or back-propagation using the pre- and postconditions. Forward-propagation can be performed to build the graph (graph data structure), with edges and nodes that fit for direct further-processing, possibly parallel sub-pipelines that are merged into one, or one pipeline that splits into two or more parallel sub-pipeline, and so on. The algorithm may comprise memory functionality for memorizing processed edges, for example to facilitate selection among alternative compositions. Non-oriented graphs may be supported.

The rule-based algorithm may form part of an expert system or domain knowledge representation system configured to implement expert rules. The rule-based algorithm may use the same vocabulary/ontology as defined by the semantic data model, as described above. Exemplary rules include those requiring the input-output compatibility and functional compatibility described above. Further rules may describe process knowledge or engineering knowhow (e.g. chemical process knowledge, or tube-into-module-flanging engineering knowhow). Further rules may specify e.g. that certain plant processes always require a refinement module, which does not necessarily change the I/O material, but which is required for a higher-quality product result, and specific process technological rules (e.g. that a separator module should separate liquids by means of a distilling process and separate solids by means of a sieve process). Further rules may describe best practises (e.g. well-working sub-pipelines in former plants, well-calibrated modules in former plants, etc.). Further rules may indicate context dependency, for example that a separator module in batch processes transforms solids with a sieve and that a separator module in continuous processes transforms liquids with a distillery. Further rules may indicate permissible and impermissible sub-pipeline-compositions, for example, one rule may state that a baking module is not to be used before a mixing module in a cake-baking pipeline. Further rules may indicate requirements for sequential or parallel processing. For example, for a cake-baking pipeline for producing a marble cake using black and white dough, one rule may indicate that the black and white doughs need to be prepared separately (i.e. in parallel sub-pipelines) until the baking step. The pipeline generation engine may thus comprise a rule-based, data-driven execution engine.

The pipeline generation engine may be configured to execute other data- and knowledge-driven algorithms that support the module pipeline connection process as well as optimization procedures and ranking algorithms, that integrate and process KPIs, module features and all other sorts of available useful data.

Figure 2:
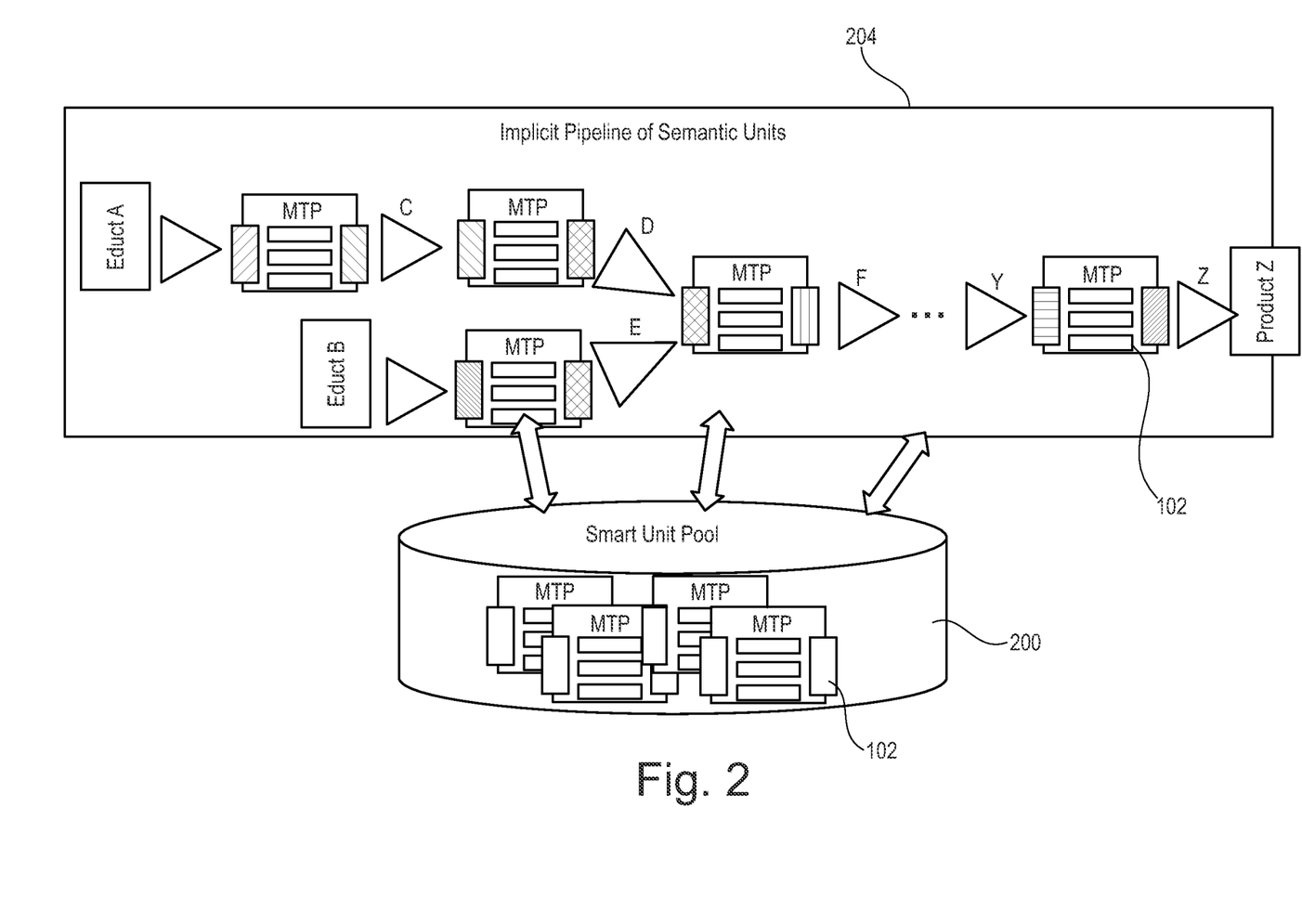
FIG. 2 illustrates a semantic pipeline automatically generated by a pipeline generation engine for transforming particular educts into a given product.

FIG. 2 shows an automatically-generated suggested semantic pipeline 204 comprising a sequence of semantic modules 102 leading from the given inputs, here "Educt A" and "Educt B", to the required output, "Product Z". Also shown is the smart unit pool 200 provided by the module library from which the semantic modules 102 may be selected. As described above, each semantic module 102 is based on the MTP for the respective module wrapped by an extended semantic description along with optional collected usage data.

In this example, given the input materials, Educt A and Educt B, the plant operator wants to obtain the output material, Product Z. The plant operator therefore enters the input and output materials into the pipeline generation engine as preconditions and postcondition, respectively. The suggested pipeline 204 for transforming Educts A and B into Product Z is generated by the pipeline generation engine by identifying a selection of semantic modules 102 which, in the particular sequence shown, transform the Educt A into intermediate material C, then into intermediate material D, which is combined with intermediate material E obtained from Educt B to obtain intermediate F, and so on, until Product Z is obtained. The suggested pipeline 204 is based on the semantically represented knowledge of what the underlying modules do, i.e. what inputs they accept and what outputs they produce, or what functionalities they have, as explained elsewhere herein. The pipeline generation engine in this example uses a rule-based, data-driven execution engine which checks compatibilities (for example I/O compatibilities) of the modules, and which runs through the pipeline 204 as the inputs for the next module are determined, until the entire pipeline is automatically generated to process the given input materials towards the requested output material. FIG. 2 further illustrates I/O compatibilities of the modules in the suggested pipeline 204 by using hashing to indicate different I/O attributes of the modules. In this way, the pipeline generation engine simplifies the engineering of plants and reduces engineering efforts.

While the modules in the above example are chained in the pipeline according to I/O compatibility, it will be understood that the pipeline generation engine may be configured to suggest pipelines based upon other attributes (such as functionalities, parameters, and other attributes) that may automatically be chained together in the pipeline, as well as or instead of using compatible I/O processing chains. By leveraging the semantic description, the pipeline generation engine is configured to build pipelines based on any type of module attribute along with respective pre- and postconditions.

As mentioned, one such exemplary attribute is functionality. Hence, the pipeline generation engine can generate a pipeline in terms of a sequence of functionalities in order to reach the overall functionality of the planned pipeline. In another example, only one material X is to be processed within a newly-to-be-generated process pipeline from an initial raw state into a final refined state (while the identity of the material remains substantially unchanged as material X). The pipeline generation engine is configured to generate a pipeline of semantic modules whose functionalities build upon each other: for example, first a milling module, then a heating module, then a stirring module, and lastly a cooling module. The precondition of the first module is "material in raw state" and its postcondition "material grounded". The precondition of the second module is "material grounded" and its postcondition "material heated up for stirring". Along with this there may be a parameter that can be manipulated in order to specify the temperature. The third module is for stirring with the precondition "material hot enough for stirring", with the same parameter as a threshold as in the second module, and with the postcondition "material stirred, ready for cooling down". The last module has the precondition "material ready for cooling down" and the postcondition "material in transportable status", possibly also with a temperature parameter. In this case, the "functionality" attribute in the semantic description may be used by the pipeline generation engine, which hence executes the matching and path-finding based upon the pre- and postconditions with respect to the modules' functionalities.

The semantic modules selected by the pipeline generation engine for inclusion in the suggested pipeline may correspond to real and/or virtual modules. Where at least one real module is included in the suggested pipeline, the pipeline generation engine may function to prevent reuse (at least temporarily) of that real module in another manually or automatically generated pipeline. Thus, the pipeline generation engine automatically accounts for shared operator activities while ensuring that a globally optimal solution for a generated pipeline may be found (as explained in more detail below).

In any of these ways, the system provides for automatic generation of suitable/feasible pipeline suggestions for the plant operator concerning how to compose a new pipeline for a given purpose.

Although the pipeline generation has been described with reference to the module library and its semantic data model, it will be appreciated that other sources and forms of data may be used to define modules as well as their inputs/outputs and functionality.

As mentioned above, the resource management system may comprise an optimization component. The optimization component is configured to: receive data identifying a required module type to be assembled into the modular plant as part of a module pipeline comprising one or more modules; and execute an optimization algorithm to select, from a plurality of modules in the module library having the required module type, a module for inclusion in the module pipeline on the basis of one or more predetermined optimization criteria. The module pipeline generation engine may be configured to generate a plurality of suggested pipelines for comparison according to one or more predetermined criteria. The optimization component may be configured to compare or rank (using e.g. a ranking component) a plurality of pipelines (e.g. those suggested by the pipeline generation engine) according to one or more predetermined criteria. The optimization algorithm may be configured to perform a local optimization for optimizing only the said module pipeline, or a global optimization to select a plurality of modules of the required type to be assembled into respective module pipelines in the modular plant. The predetermined optimization criteria may comprise one or more of product quality; throughput; capacity; resource/material efficiency; energy efficiency; energy consumption; time-to-service; uptime; equipment availability; mean time between failure; utilization rates of services and equipment; minimization of module usage. In particular, where the collected usage data comprises previously measured key performance indicators, these may be used to determine an optimum or preferred selection and sequence of modules for transforming the precondition(s) into the postcondition(s) while satisfying the predetermined criteria.

Whether the pipeline is generated manually or automatically, it may be the case that the module library comprises several semantic modules of a certain type from which a choice may be made regarding which one to select or which one is the best suited to a given purpose. For example, these exchangeable modules may have different characteristics, e.g., one module may be larger i.e. having a larger capacity concerning how much liquid it can distil, or one module may have less runtime left until it goes into service. Hence, when planning a production process, there will be the question as to which module to use. To this end, the engineering tool further comprises an optimization component configured to optimize the pipeline (where multiple unit choices are available) on the basis of one or more predetermined criteria. As mentioned above, each of the semantic modules in the module library comprises a semantic description describing or representing the underlying module, whereby the underlying modules are enriched with real data which is semantically mapped in a structured way. The optimization component is configured to use the module attributes contained in the semantic description to perform optimization.

Various optimization criteria that may be used by the optimization algorithm are envisaged by the present disclosure. The optimization criteria may correspond to, relate to, or be based on the contents of the above-described semantic description optionally including the collected usage data. Exemplary optimization criteria include: uptime, capacity, energy efficiency, energy consumption, maintenance intervals/cycles, time-to-service, the material or medium or type thereof most recently used in the unit, equipment availability, unit availability, unit schedule (when it will become available for reuse), the mean time between failure (MTBF) of the unit or of its equipment, utilization of the services and equipment (e.g. how often a valve is opened or closed), resource/material efficiency, minimization of module usage, or any other suitable KPI. The resource management system may furthermore store (e.g. in the same database) data relating to previously used module combinations indicating outcomes in terms of quality, throughput, efficiency, or other KPIs for the modular plant, to assist in assessing whether modules in a particular combination functioned together successfully. These criteria are used by the optimization component to make intelligent and automated selections of the modules which are usable or best suited for the modular plant that is to be engineered or assembled. For example, data identifying which medium was flowing through the module may be used to determine whether extensive cleaning is needed before the module can be used in another plant. The collected usage data can be used in order to find the best possible module for the current planning according to the respectively chosen optimization criteria.

The optimization component is configured to receive a pipeline, generated manually or automatically as described above and comprising one or more representations of real or virtual modules or types thereof. Selected optimization criterion or criteria are minimized/maximized over the set of modules in the pipeline by executing an optimization algorithm that makes use of semantic data describing different characteristics and constraints of the modules to optimize in relation to the selected criteria. The optimization algorithm is thus configured to find optimal module combinations for the pipeline. This may involve excluding one or more modules in the received (input) pipeline from the pipeline altogether, or replacing or exchanging these modules by alternative, more suitable modules. Based on the semantic description including for example collected usage data such as KPIs, the optimization algorithm finds module combinations that lead to, for example, the highest quality of the product, the highest throughput, the highest energy efficiency, etc.

The optimization algorithm may be implemented using a machine learning model trained to select modules based on their semantic description and optionally also on the basis of data indicating how well module combinations have performed in the past, e.g. which modules have been frequently selected in coexistence in the past and which have coexisted well together.

The optimization results can be visualized to the user optionally including an indication as to how the optimal configuration of modules was found. The user then selects the final configuration.

If more than one criterion is optimized, the result may be two or more locally optimal generated pipelines that are suggested to the plant operator in order to make a decision on which criterion is considered more important to be globally optimal. The optimization component may again use ranking functionality (i.e. the ranking component) to rank the two or more pipelines according to selected or predetermined criteria.

The optimization may be a local optimization for only the given pipeline, or a global optimization indicating how to distribute the available module resources among several pipelines. For example, where a module has less runtime left until service, it may turn out that this runtime is still long enough for a planned batch production, so that, from a global optimization perspective, it would be better to use this module so that other similar modules which have more runtime left remain available for other possible batch production processes. Or, it may be the case that one module is flexible and could theoretically be used for many production processes, and that another exchangeable module which is more specialized would perform the same function, so that the global optimization suggests using the more specialized module in order to save the more flexible module for other possible processes where it might be needed.

The modules which are selected by the optimization component may comprise real and/or virtual modules. For example, a virtual pipeline A may be preferred over virtual pipeline B since it consumes less energy in total, without reference to real module data being necessary for the optimization. However, in order to consider specific optimization criteria based on collected usage data, for example to ascertain whether a real module is actually available in the real unit pool or e.g. subject to maintenance, real modules may be selected.

Figure 3:
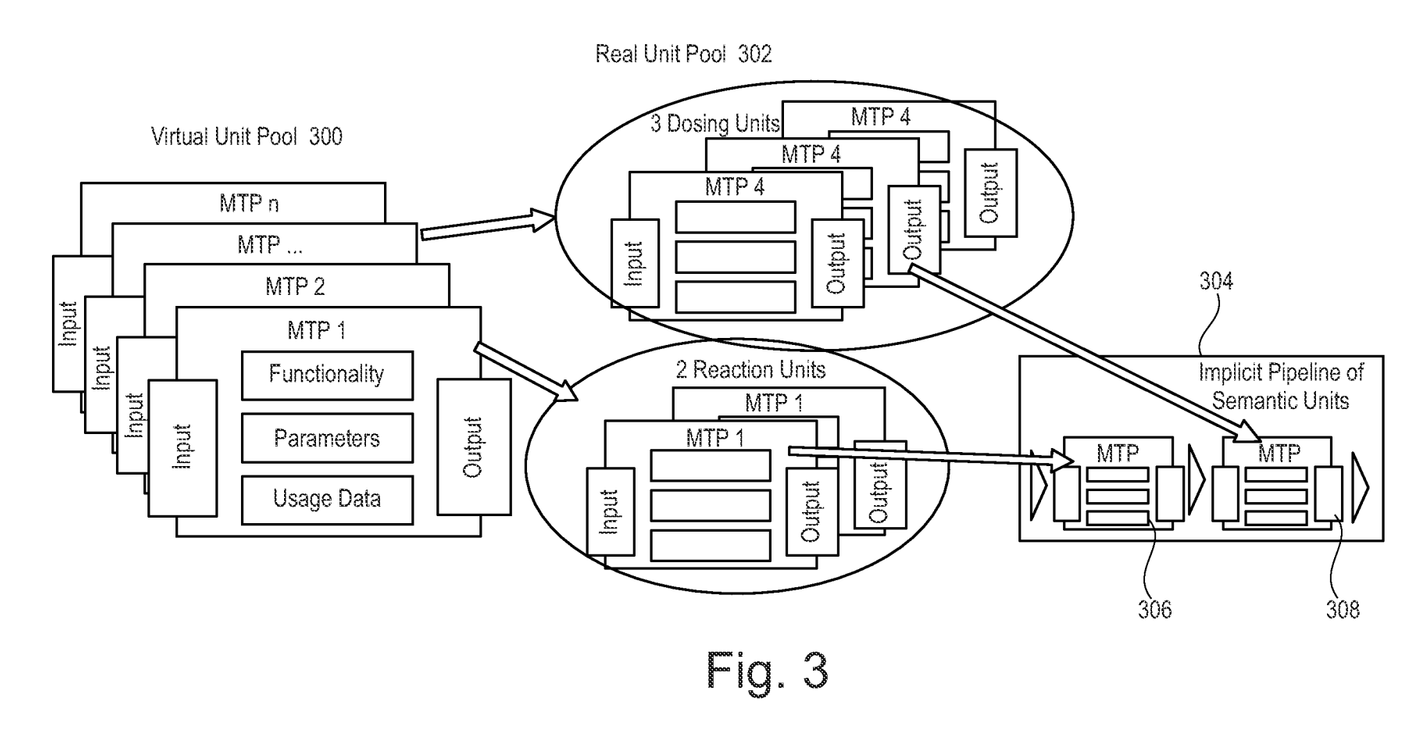
FIG. 3 illustrates optimization of an automatically generated semantic pipeline by the pipeline generation engine.

FIG. 3 illustrates one example of optimizing a semantic pipeline 304 of semantic modules using the optimization component. As shown in FIG. 3, the smart unit pool 200 administered by the module library comprises both a virtual unit pool 300 and a real unit pool 302. The virtual unit pool 300 comprises virtual units in the form of module type packages (MTPs) defining module types. Each module type appears in the virtual unit pool 300 only once (shown in FIG. 3 are module type defined by MTP1-MTPn). The real units in the real unit pool 302 correspond to types found in the virtual unit pool 300 and may be associated with collected usage data. In this example, the plant operator owns multiple real units of different types, here 3 real dosing units, 2 real reaction units. In a first step, the implicit pipeline 304 is generated manually or automatically (as described above) using virtual units of certain types, and in a second step the optimization component executes the optimization algorithm to replace these virtual units by representations of real units of the given types selected from the real unit pool 302 so as to prefer one real unit over another according to given optimization criteria. Optimization results are displayed to allow the plant operator to see different plant composition alternatives and their advantages and disadvantages. In the example shown in FIG. 3, the optimization component identifies from the real module pool 302 two alternative reaction units (of the module type MTP1 selected as the first module of the pipeline) and three alternative dosing units (of the module type MTP4 selected for the second unit of the pipeline) which may be used to obtain a particular product. In this example, the optimization component selects reaction unit 306 and dosing unit 308 for the pipeline 304, on the basis of the collected usage data stored in the semantic description of the respective semantic units together with the predetermined optimization criteria. For example, where the predetermined criterion is to maximize module uptime, the optimization algorithm may select the units 306 and 308 by reason of those units having a longer MTBF than the other candidate units, and/or a longer time until the next scheduled maintenance.

The optimization component may additionally or alternatively function to optimize pipelines including semantic modules corresponding to real modules, for example those input by an engineer. In a further example of a local optimization scenario, in which a pipeline for an initial production plan made by the engineer includes a selected distilling module that is sized too large and thereby consumes too much energy, the optimization component selects an alternative, smaller distilling module which suffices for the planned batch.

Although the optimization component is described above in reference to the use of the semantic description including the collected usage data, which is described above as according to the semantic data model, it will be appreciated that data from any appropriate other source and in any appropriate format may be used for the optimization.

To assist the plant operator in validating the selection of modules/pipelines, the resource management system may comprise a simulation component or simulation tool configured to provide simulation functionality to allow simulation of the operation of a module pipeline comprising one or more modules in a modular plant (whether the pipeline is manually or automatically generated and whether automatically optimized or not), for example to identify possible bottlenecks and inefficiencies, try out alternative modules to determine if this optimizes the simulation, or generally to simulate 'what-if' scenarios. For example, the planning may start with an initial process map in the form of a pipeline manually generated by the user to represent modules and how they are connected, to define what kind of process the user has in mind. This pipeline is most likely not optimal. The user may utilize the simulation functionality of the engineering tool to simulate different what-if scenarios in order to uncover sub-optimal configurations. For example, the user may simulate what happens if an alternative distilling module is used instead of the currently selected distilling module which is much larger, or which has a much longer time-to-service. The simulation component may be configured automatically to simulate different what-if scenarios (i.e. alternative configurations/permutations and compare the results. The number of scenarios may in practice depend for example on the time which the planner wants to invest in simulation.

The resource management system as described herein could be provided:—

As a central unit pool provided to multiple plant operators. The central pool comprises a collection of semantic modules corresponding to modules previously used by the plant operators and including semantic descriptions along with usage data collected from the commissioned plants. Not only local, unit-centric optimization but also global, unit-in pipeline-context optimization is thus facilitated. This solution may be cloud-based, scalable and easily accessible.

As a private unit pool managed by the plant operator. The private unit pool allows the plant operator to manage and administer a collection of semantic modules corresponding to real modules owned by the plant operator. Parameters, KPIs and other collected usage data (best practices, calibrated parameter combinations, maintenance intervals, MTBF, last maintenance done, last material used, clean or not, active/available/unused, etc.) are gathered from the real modules and uploaded to the database to allow for application of the system's pipeline generation engine and optimization component. Both an on-premise implementation as well as a cloud-based solution are possible, depending on the wishes/requirements of the plant operator. As an inhouse product in order to reduce the plant operator's costs, or as an offer to clients to reduce their own cost.

The subject-matter described herein may find particular application in module-based production and resource planning. Especially in pharmaceutical batch production with small batch sizes, module resources are frequently exchanged between different batches. When planning a new batch, or when re-engineering the module setup of an existing batch production (e.g. because the production load has changed so that the selection of existing modules seem to pose some bottlenecks), the subject-matter described herein will allow the planner to identify and select the right i.e. best suited modules.

The subject-matter described herein may find further application in module maintenance planning. Modules need to be maintained from time to time and have characteristics such as "time-to-service" that indicate how many runtime hours are left until the next planned inspection service. Here, optimization and what-if simulation can assist in determining an optimal maintenance plan for modules. For example, with help of the known production plan specifying how different modules will be used in the near future, an example optimization scenario would be to undertake maintenance of a module earlier than planned, because it is not used then, which turns out to have a better utilization and process output in the end.

Thus, the benefits offered by the resource management system as described herein include—among others—(1) re-use of modules and consequential reduced engineering effort through a searchable module pool; (2) simplified or automatic generation of feasible pipelines that are (i) directly compatible by means of semantic checks and controls and (ii) capable of being optimized with respect to miscellaneous criteria such as uptime, maintenance intervals, availability, etc.

Figure 4:
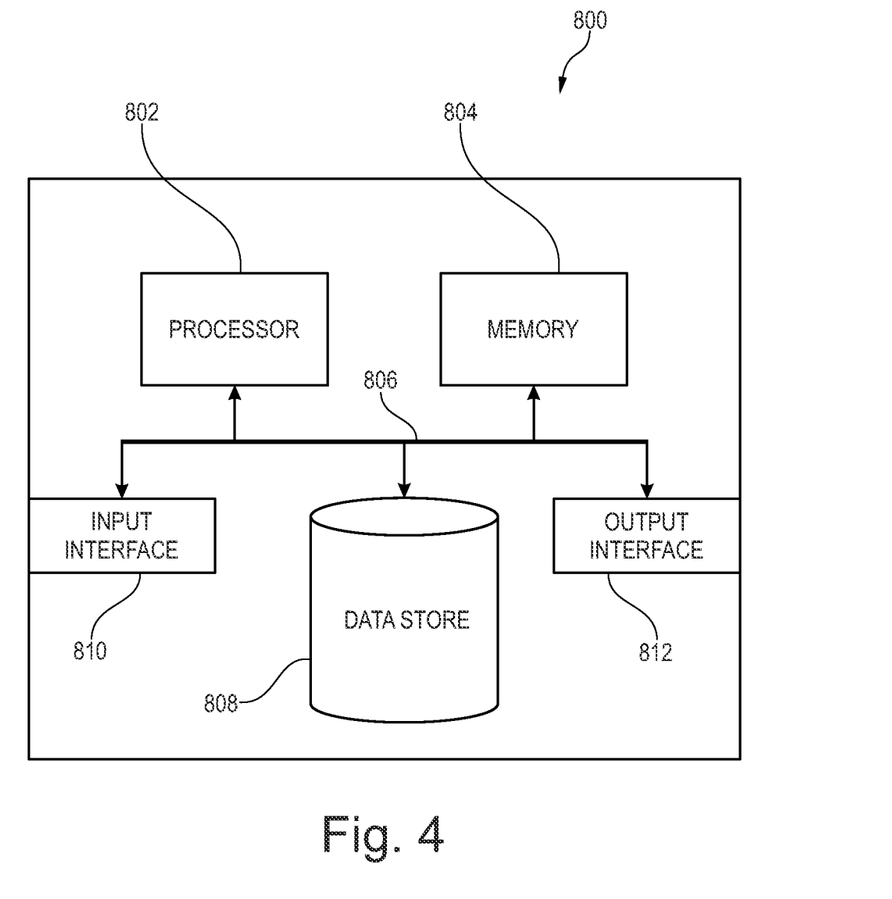
FIG. 4 illustrates a computing device that can be used in accordance with the systems and methods disclosed herein.

Referring now to FIG. 4, a high-level illustration of an exemplary computing device 800 that can be used in accordance with the systems and methodologies disclosed herein is illustrated. In particular, the computing device 800 may be used to implement the above-described resource management system or engineering tool along with its pipeline generation engine and optimization component. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store conversational inputs, scores assigned to the conversational inputs, etc.

The computing device 800 additionally includes a data store 808 that is accessible by the processor 802 by way of the system bus 806. The data store 808 may include executable instructions, log data, etc. The data store 808 may be used to implement the above-described module library and its database.

The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812. It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although the above description is provided in the context of the MTP standard, it will be understood that the present disclosure is not limited to the use of MTP in defining units and that other standardized module descriptions may be used.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

While one or more embodiments of the invention have been illustrated and described in detail in the drawings and foregoing description, such illustration and description are to be considered exemplary and not restrictive. The invention is not limited to the disclosed embodiments. Other variations to the disclosed embodiments can be understood and effected by those skilled in the art, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used advantageously. A computer program may be stored/distributed on a suitable medium, such as an optical storage medium or a solid-state medium supplied together with or as part of other hardware, but may also be distributed in other forms, such as via the internet or other wired or wireless communications systems.

Any reference signs in the claims should not be construed as limiting the scope.

While one or more embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented resource management method for modular plants, the method comprising:
   receiving data identifying a required module type to be assembled into the modular plant as part of a module pipeline comprising one or more modules, the one or more modules being wrapped by a semantic description and collected usage data, the data including a precondition and a postcondition for the module pipeline;
   executing an optimization algorithm to select, from a plurality of modules having the required module type and based on the data, a module for inclusion in the module pipeline on a basis of one or more predetermined optimization criteria and module attributes of the module; and
   determining a sequence of modules included in the module pipeline to match the precondition and the postcondition of the module pipeline based on input attributes and output attributes of each module of the one or more modules.

2. The method of claim 1, further comprising simulating operation of one or more candidate pipelines each comprising at least one of the plurality of modules having the required module type.

3. The method of claim 2, wherein:
   the predetermined optimization criteria comprise one or more members of a group consisting of capacity, energy consumption, and time-to-service, and
   the optimization algorithm identifies one or more bottlenecks or inefficiencies in the simulated operation of at least one candidate pipeline.

4. The method of claim 2, comprising presenting results of the simulation to the user and receiving user selection of said the at least one candidate pipeline.

5. The method of claim 1, wherein the optimization algorithm utilizes a machine learning model trained to select modules for inclusion in module pipelines based on one or more of module attributes and the collected usage data relating to modules.

6. The method of claim 1, wherein the optimization algorithm performs a local optimization for optimizing only the module pipeline.

7. The method of claim 1, wherein the optimization algorithm performs a global optimization to select a plurality of modules of the required module type to be assembled into respective module pipelines in the modular plant.

8. The method of claim 1, wherein the predetermined optimization criteria comprise one or more members of a group consisting of product quality; throughput; capacity; resource/material efficiency; energy efficiency; energy consumption; time-to-service; uptime; equipment availability; mean time between failure; utilization rates of services and equipment; and minimization of module usage.

9. The method of claim 1, wherein the module attributes comprising one or more members of a group consisting of module functionality; module parameters; module usage data; process parameters; and calibration parameters.

10. The method of claim 1, wherein the optimization algorithm utilizes collected usage data relating to prior use of the plurality of modules in the modular plant, the collected usage data relating to prior use of the plurality of modules in the modular plant relating to one or more members of a group consisting of mean time between failure; module uptime; utilization rates of services and equipment; prior calibration parameters; frequent plant contexts; maintenance performed; materials/medium processed; application purpose and restrictions for chemical reactions; module availability schedule; and maintenance cycles/intervals.

11. The method of claim 1, wherein the optimization algorithm utilizes data indicating performance of prior module combinations in selecting the module for inclusion in the module pipeline.

12. The method of claim 1, wherein the optimization algorithm selects, from the plurality of modules having the required module type, a plurality of candidate modules for inclusion in the module pipeline and ranks the candidate modules according to the one or more predetermined optimization criteria.

13. A computing device comprising a processor configured to perform the method of claim 1.

14. A non-transitory computer-readable medium comprising instructions that, when executed by a computing device, enable the computing device to perform the method of claim 1.

* * * * *